United States Patent [19]

Moody

[11] Patent Number: 4,504,003
[45] Date of Patent: Mar. 12, 1985

[54] APPARATUS FOR CUTTING CERAMIC TILE

[76] Inventor: Gerald W. Moody, 2007 Cedar, Jacksonville, Ill. 62650

[21] Appl. No.: 471,263

[22] Filed: Mar. 2, 1983

[51] Int. Cl.³ .............................................. B26F 3/00
[52] U.S. Cl. .................................. 225/96.5; 125/23 T; 225/93
[58] Field of Search .............. 225/96.5, 93; 125/23 T, 125/23 R

[56] References Cited

U.S. PATENT DOCUMENTS 3,371,833  3/1968  Sutton ........................... 225/96.5 X
4,175,684  11/1979  Butler ........................... 225/96.5 X
4,378,782  4/1983  Richard et al. ................. 225/96.5 X

FOREIGN PATENT DOCUMENTS 892125  10/1953  Fed. Rep. of Germany .... 125/23 T
1481135  7/1977  United Kingdom ............... 225/96.5

Primary Examiner—Frank T. Yost
Attorney, Agent, or Firm—William A. Snow

[57] ABSTRACT

A tile cutting apparatus having an elongated base with two pairs of spaced side walls, a guide for a cutting tool, and an adjustable tile abutment block and breaking bar to snap cut-off a portion of tile to be removed.

5 Claims, 2 Drawing Figures

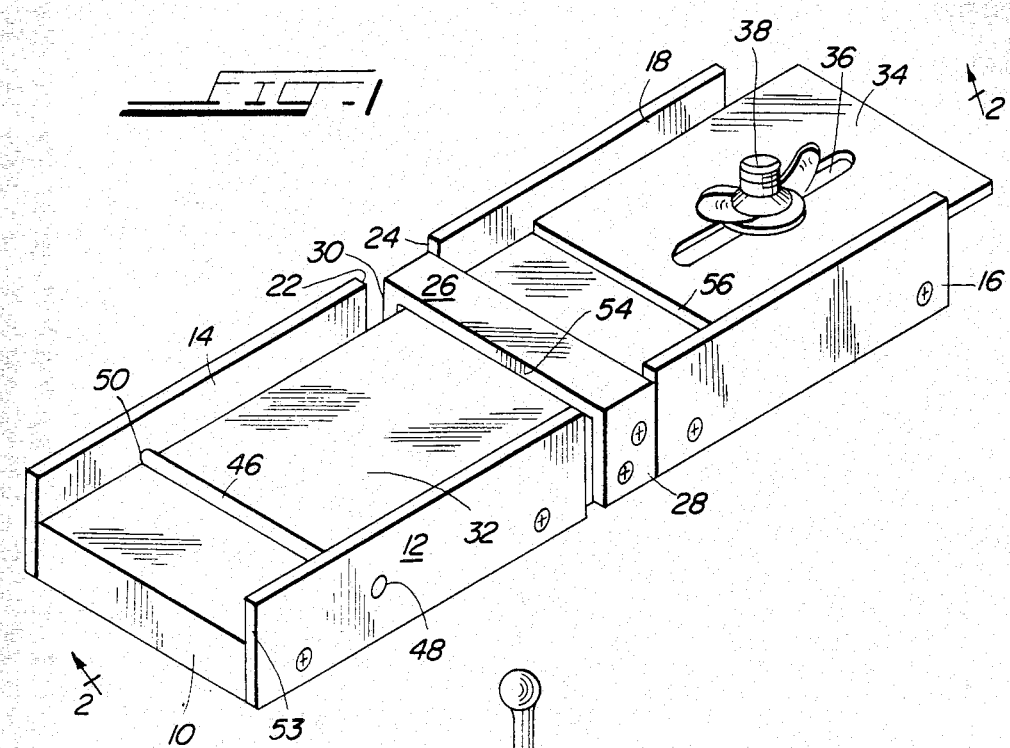
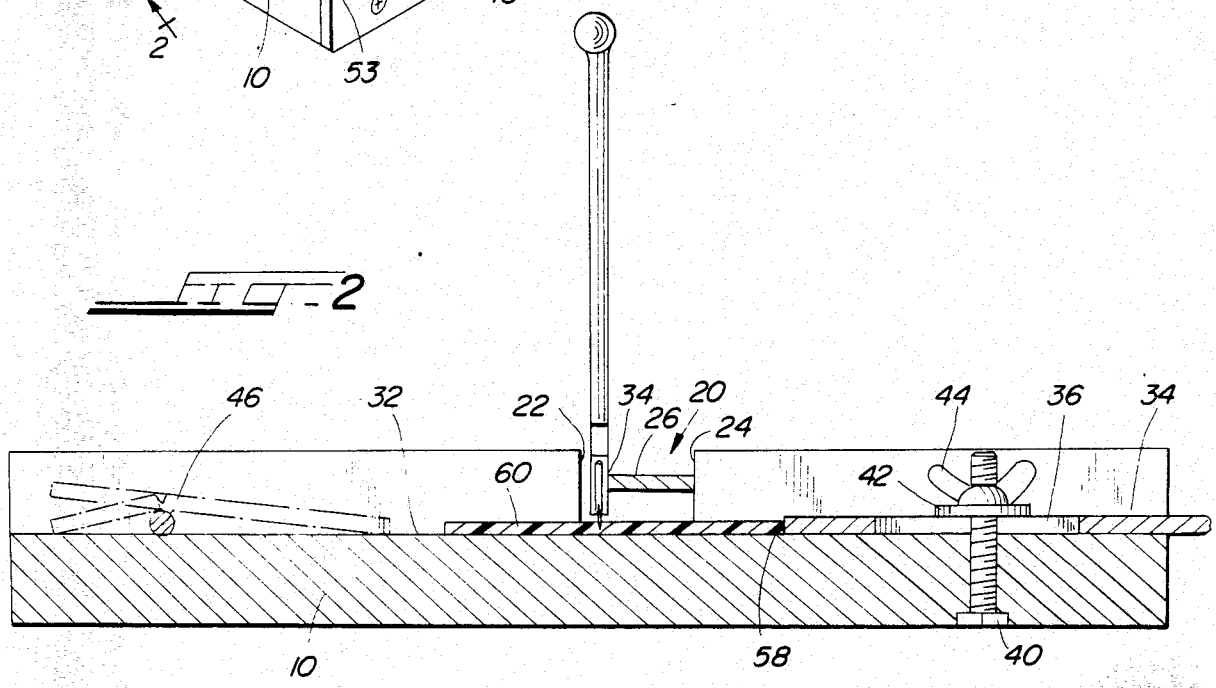

APPARATUS FOR CUTTING CERAMIC TILE

BACKGROUND OF THE INVENTION

The cutting of ceramic tile is very difficult because the tile chips. The normal method of reducing the width of tile is by nibbling, i.e., removing small pieces of the tile at a time over and over again until the file fits where intended. This is time consuming and dangerous as the nipped pieces of tile fly all over. It was to overcome this problem that the present invention was conceived.

The present invention was searched and the only patents found were of interest only, namely U.S. Pat. Nos. 4,030,195, 4,175,684, 3,371,833, 3,693,852 and 3,371,833.

SUMMARY OF THE INVENTION

A tile cutting device having an elongated base with pairs of spaced side walls, a guide for a tile cutter on the base, means on one of the pairs of spaced walls to sever the tile and adjustable means on said base for abutment of the tile to be cut.

BRIEF DESCRIPTION OF THE DRAWINGS

FIG. 1 is a perspective view of the device of the present invention; and

FIG. 2 is a cross-sectional view taken on the line 2—2 of FIG. 1 with a severed tile shown in broken lines.

DETAILED DESCRIPTION OF THE DRAWINGS

The apparatus of the present invention comprises a thick base 10 and pairs of spaced side walls 12, 14, 16, 18 anchored adjacent their lower ends to the sides of the base 10 by any suitable means such as screws or the like. The base is preferably eleven inches long, four and one-half inches wide and three-fourths of an inch thick. The side walls 12, 14 are preferably one and one-quarter inches high and five inches long. The side walls 16, 18 are preferably one and one-quarter inches high and four and one-half inches long. Therefore the space 20 between the inner ends 22, 24 of the walls 12, 14, 16, 18 is preferably one and one-half inches.

A cutter guide is provided for this invention and abuts the inner walls 24 of the side walls 16, 18 and has a top 26 and depending side legs 28, 30. The side legs 28, 30 are preferably one and three-sixteenths inches high and three-quarters of an inch wide. The top wall 26 is preferably four and one-half inches in length and three-quarters of an inch wide. The side legs are anchored adjacent the sides of the base in any suitable manner such as by screws and the top 26 is positioned over the top 32 of the base 10.

An abutment plate 34 is positioned between the side walls 16, 18 and lies on the top 32 of the base 10 for fore and aft sliding movement. The plate 34 is provided with an elongated slot 36, in which the upper end of bolt 38 seats. The bolt is provided with a head 40 countersunk in the base 10 and the shaft extends upwardly through the base 10 and above the plate 34. A washer 42 and thumbnut 44 are positioned on the upper end of the bolt 38 to anchor the plate 34 in any adjustable position. As should be obvious, the washer 42 spans the slot 36.

The tile cutter break rod 46 is about four and three-quarter inches long and is 11-gauge in diameter. The rod 46 seats in apertures 48, 50 in the side walls 12, 14 and lays on the top 32 of the base 10. The rod lies inwardly of the ends 52 of the side walls 12, 14 approximately one and one-half inches.

In operation, if a half inch were to be cut off a tile, the thumb screw 44 would be loosened and the plate 34 shifted fore or aft so that only a half inch of tile appeared below the forward edge 54 of the cutter guide. This, of course, can be done by a ruler. Then the abutment plate 34 is adjusted so that the forward end 56 abuts the rear end 58 of the tile 60 and anchored in place by the thumb screw 44.

Now a glass cutter is moved across the tile, bearing against the guide edge 54 to cause a deep serration in the tile. The tile is then moved forwardly and the deep serration placed over the rod 46. By bearing downwardly with the hands adjacent each end of the tile, the tile will break cleanly and easily along the scratch line.

Although but one specific embodiment of this invention is herein shown and described, it will be understood that details of the construction shown may be altered or omitted without departing from the spirit of the invention as defined by the following claims.

I claim:

1. A tile cutter, a base having a top and opposite sides, a first pair of side walls shorter than the length of said base, each wall of said first pair of side walls secured one to each side of said base and having a portion extending above said top of said base and having an inner edge, a second pair of side walls shorter in length than said first pair of side walls, each wall secured one to each side of said base and having a portion extending above said top of said base and having an inner edge, a space between said inner edges of said first and second side walls, and abutment means on the top of said base extending between said secon pair of side walls for adjustable movement toward and away from said inner edges of said side walls for abutting a tile to be cut.

2. The device according to claim 1 wherein the first pair of said side walls support a break rod positioned on the top of said base.

3. The device according to claim 1 wherein the abutment means is provided with a medial elongated slot and may be secured in a set position toward and away from said inner edges of said side walls by a bolt extending through said slot and into said base.

4. The device according to claim 3 wherein a cutter guide is provided in said space.

5. The device according to claim 1 wherein a cutter guide means is provided in said space comprising a guide and a pair of depending legs, one leg secured to each side of said base, said guide spaced above the top of said base and abutting the inner edges of said second pair of side walls.

* * * * *